United States Patent [19]

Masuda

[11] Patent Number: 4,908,640
[45] Date of Patent: Mar. 13, 1990

[54] APPARATUS FOR TAKING PHOTOGRAPH WITH MONITORING SYSTEM

[75] Inventor: Nobuyuki Masuda, Saitama, Japan

[73] Assignee: Mamiya Camera Co., Ltd., Tokyo, Japan

[21] Appl. No.: 282,777

[22] Filed: Dec. 12, 1988

[30] Foreign Application Priority Data

Dec. 14, 1987 [JP] Japan .................................. 62-189613

[51] Int. Cl.[4] .............................................. G03B 17/50
[52] U.S. Cl. ....................................... 354/75; 354/81;
354/86; 354/150; 354/293; 358/76; 358/224
[58] Field of Search ..................... 354/81, 75, 76, 118,
354/119, 129, 150, 293, 210, 110, 83, 84, 85, 86;
358/76, 224, 225, 909

[56] References Cited

U.S. PATENT DOCUMENTS

| | | | |
|---|---|---|---|
| 3,608,456 | 9/1971 | Hauser | 354/150 |
| 3,643,570 | 2/1972 | Reid et al. | 354/119 |
| 3,883,883 | 5/1975 | Sano et al. | 354/76 |
| 4,303,322 | 12/1981 | Someya | 354/219 |
| 4,488,794 | 12/1984 | Dolgow et al. | 354/293 |
| 4,650,305 | 3/1987 | Hines | 354/293 |
| 4,804,983 | 2/1989 | Thayer | 354/76 |

Primary Examiner—A. A. Mathews
Attorney, Agent, or Firm—Armstrong, Nikaido, Marmelstein, Kubovcik & Murray

[57] ABSTRACT

An apparatus for taking photograph with monitoring system comprises a primary camera for taking an objective photograph, a monitor camera, and a half mirror disposed in front of the lens of the primary camera obliquely to its optical axis, the lens of the monitor camera and the lens of the primary camera being located at the symmetrical positions with respect to the half mirror, so that the monitor image without any parallax and timelag from the image on the objective photograph by the primary camera can be obtained by the monitor camera.

14 Claims, 2 Drawing Sheets

APPARATUS FOR TAKING PHOTOGRAPH WITH MONITORING SYSTEM

BACKGROUND OF THE INVENTION

1. Field of the Invention

This invention relates to an apparatus for taking photograph with monitoring system which is suitable for taking a photograph of person at photo studio, wedding hall, or the like.

2. Description of the Prior Art

In the case of taking a photograph which is impossible to retake, for instance, a photograph on wedding, it is an ordinary way to take two or more photographs and choose the best one among them after development. In this way, however, there is not always satisfactory one in such photographs.

For this reason, in some of photo studios, a monitor camera such as a still video camera or an instant camera is provided near the primary camera for taking an objective photograph. The monitor camera is synchronized with the primary camera so as to take a picture of an object at the same time when an objective photograph is taken with the primary camera. Therefore, the person's appearance at the moment of taking the objective photograph can be checked through the picture by the monitor camera on the spot. Especially, in the case that the object is person, a failure caused by his closed eyes on the objective photograph is avoidable.

In that case, however, there is a parallax between the photograph taken by the primary camera and the picture by the monitor camera because of the distance between the lenses of two cameras. In many cases, since a camera using a large size film such as 5×7" or 8×10" is employed as the primary camera, such a parallax becomes considerably large because of the relatively large size body of the primary camera. Particularly in the case that a photograph of persons in ranks is taken, a person in a rear rank may be covered by a person in a front rank on the objective photograph even if he in the rear rank is in sight on the picture by the monitor camera. To the contrary, there is a case that, even if he is in sight on the objective photograph, he is out of sight on the picture by the monitor camera so it is impossible to check how he appears.

U.S. Pat. No. 4,303,322 discloses an electronic image pick-up device for a single-lens reflex camera having an interchangeable finder. In this prior art, the object image light entered through the objective lens of a camera and reflected upward by a reflex mirror is converted into a picture signal through a solid state image sensor. The pictur signal is used for displaying an object image on liquid crystal display elements, or it is sent to a video tape recorder for recording the object image. When the release button of the camera is depressed, the reflex mirror is flipped upward like that in an ordinary single-lens reflex camera so that the object image light through the objective lens reached to the surface of a film and expose it. Accordingly, there is no parallax between the image on the photographic film and the image displayed on the liquid crystal display elements or recorded in the video tape recoder.

In this prior art, however, because the reflex mirror is in the flipped up position when the camera is performing an exposure operation, any part of the object image light from the objective lens is not introduced to the solid state image sensor. This means that the object image can not be monitored during the exposure operation. In order to overcome this defect, the solid state image sensor of this prior art produces a picture signal of the object image which is the same as the picture signal provided just before the beginning of the exposure operation, and the object image is continuously displayed or recorded during the exposure operation. In that case, however, the object image displayed during the exposure is not real. Thus, it is impossible to check the object's look at the moment of taking an objective photograph through such an object image displayed.

Moreover, a camera to which the prior art device is applied must have a special construction such that its finder portion is detachable. Therefore, it is hard to apply the prior art device to an ordinary camera currently used at photo studio or the like.

SUMMARY OF THE INVENTION

Accordingly, it is an object of the present invention to provide an apparatus for taking photograph with monitoring system which makes a picture of an object without any parallax from the image on an objective photograph taken by a primary camera can be obtained by a monitor camera.

It is another object of the present invention to provide an apparatus for taking photograph with monitoring system which makes a real picture of an object at the moment of taking an objective photograph can be obtained by a monitor camera.

It is still another object of the present invention to provide an apparatus for taking photograph with monitoring system in which cameras currently used at photo studio or the like can be utilized for a primary camera and a monitor camera without reformation.

These objects are attained by the invention as follows. An apparatus for taking photograph with monitoring system comprises a primary camera for taking an objective photograph, a monitor camera, and a half mirror disposed in front of the lens of the primary camera obliquely to its optical axis, the lens of the monitor camera and the lens of the primary camera being located at the symmetrical positions with respect to the half mirror. In this invention, the expression "lenses are located at the symmetrical positions" means that the principal points of the lenses are at the symmetrical positions.

The above and other objects, features and advantages of the invention will be apparent from the following detailed description which is to be read in conjunction with the accompanying drawings.

DETAILED DESCRIPTION OF THE PREFERRED EMBODIMENT

Figure 1:
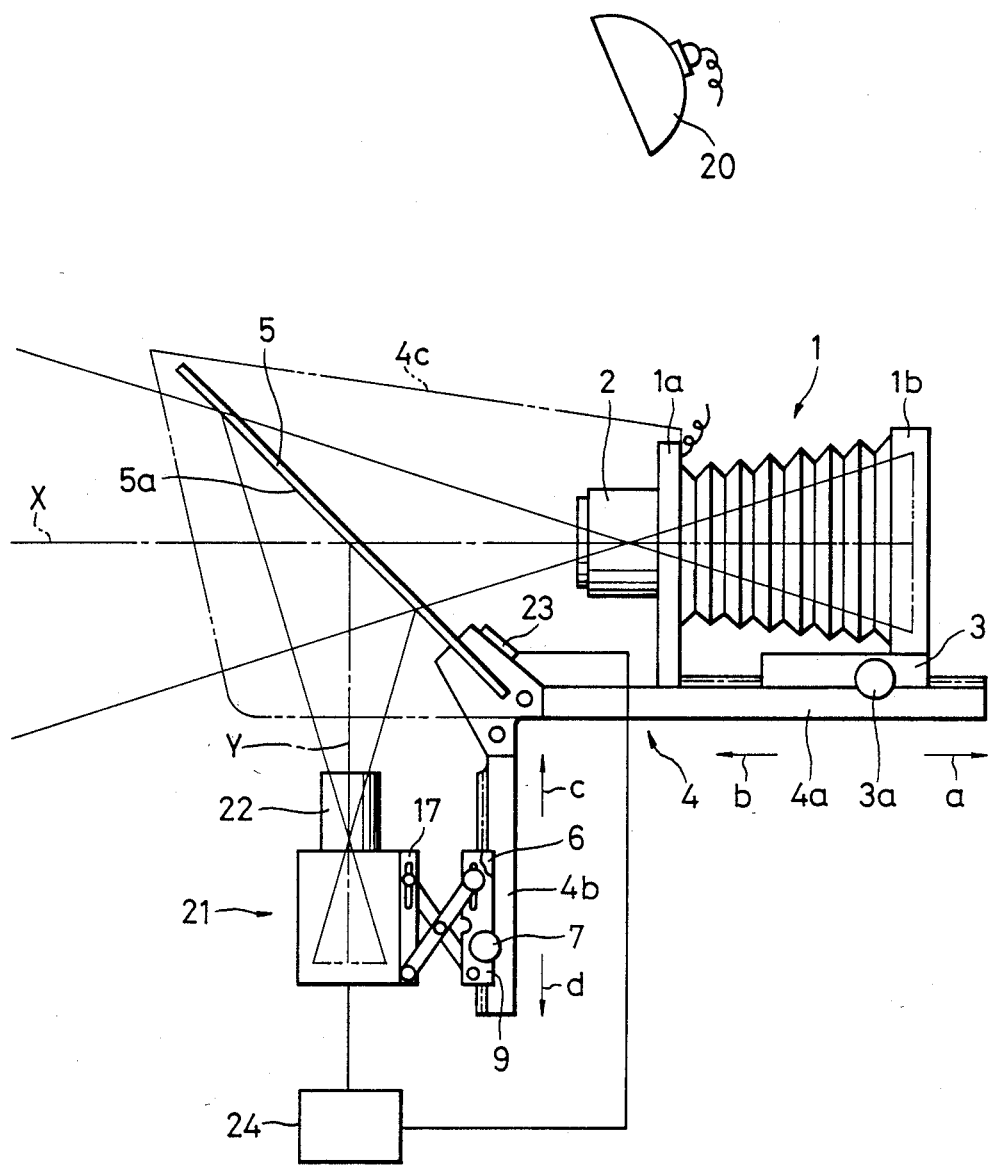
FIG. 1 is a side view showing the entire construction of an apparatus according to the invention.

Referring first to FIG. 1, a primary camera 1 is a type using a large size film, for instance, 5×7" or 8×10" film. A lens board 1a of the camera 1 is mounted to a camera support 4, which is formed into an L-shape. A lens 2 for taking an objective photograph is provided on the lens board 1a. A camera back 1b is supported by a horizontal portion 4a of the camera support 4 through a camera mount 3. The camera back 1b is able to slide in the front and rear direction (directions denoted by arrows a and b in FIG. 1) together with the camera mount 3 through a rack and pinion mechanism when a focus adjustment knob 3a is turned. The focusing of the primary camera 1 is effected by the movement of the camera back 1b.

A half mirror 5 having the reflectivity of, for instance, 20% is fixed to the camera support 4 in front of the primary camera 1. The half mirror 5 inclines in relation to the optical axis X of the lens 2 such that the angle between the normal line of the plane mirror 5 and the optical axis X is 45°.

Figure 2:
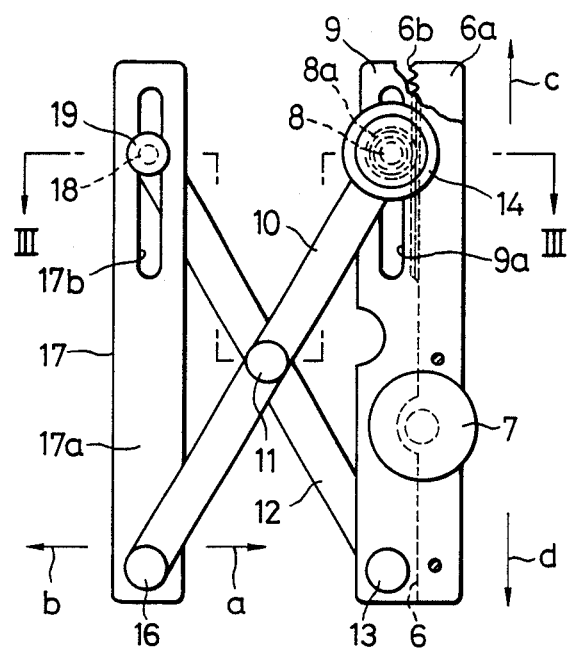
FIG. 2 is an enlarged side view showing the construction of the monitor base unit for mounting a monitor camera of the apparatus in FIG. 1.
Figure 3:
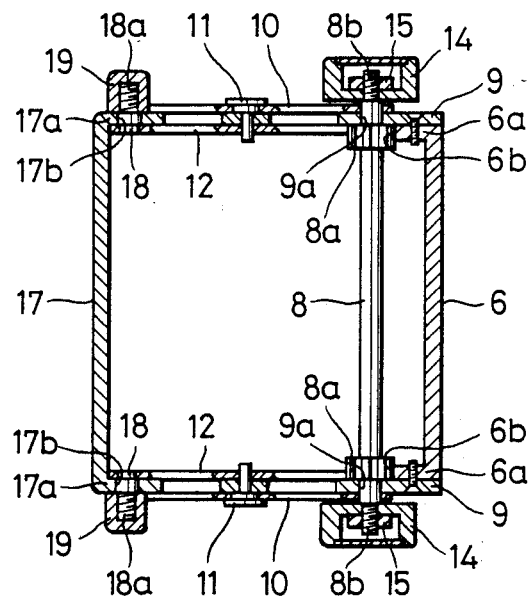
FIG. 3 is a cross-sectional view taken along line III—III of FIG. 2.

A sliding plate 6 is provided on a vertical portion 4b of the camera support 4. The sliding plate 6 is able to slide upward or downward (direction denoted by arrow c or d in FIG. 1) through a rack and pinion mechanism as a vertical movement mechanism when a height adjustment knob 7 is turned. The sliding plate 6 has a pair of side plate portions 6a as shown in FIGS. 2 and 3. A vertical rack 6b is formed at the upper part of each of the side plate portions 6a. Guide plates 9 are fixed to the outside surface of the side plate portions 6a. The sliding plate 6 is provided with a rotational shaft 8 which is received by vertically elongated holes 9a formed in the guide plates 9. The rotational shaft 8 is provided with a pair of pinions 8a in the vicinities of the both ends. Each pinion 8a engages with the rack 6b of each side plate portion 6a.

The rotational shaft 8 is provided with a pair of parallel links 10, the upper end of each of which is pivotably connected to the rotational shaft 8. The sliding plate 6 is provided with another pair of parallel links 12, the lower end of each of which is pivotably connected to the guide plate 9 through a shaft 13 located just below the elongated hole 9a. Each pair of the link 10 and link 12 is interlinked at those middle portions through a pivot pin 11. Adjustment knobs 14 are screwed onto threaded portions 8b formed on both end portions of the shaft 8. Each adjustment knob 14 is firmly fixed to the shaft 8 with a lock nut 15.

The lower ends of the links 10 are pivotably connected through a shaft 16 to side plate portions 17a formed on both sides of a monitor base 17. A pair of pins 18 projecting outward from the outside surfaces at the upper end portions of the links 12 are received by elongated holes 17b formed in the side plate portions 17a just above the shaft 16. Each pin 18 is movable vertically along each elongated hole 17b. A pair of fixing knobs 19 are screwed onto threaded portions 18a formed on the pins 18. The links 12 can be fixed to the monitor base 17 by driving home the fixing knobs 19.

The rack 6b, pinion 8a, links 10 and 12, elongated holes 9a and 17b and shaft 18 described above constitute a lateral movement mechanism for moving a monitor camera 21 in parallel with the optical axis X of the lens 2 of the primary camera 1.

In FIG. 1, a screen board 4c is disposed so as to cover the upper side and both lateral sides of a front space of the lens 2. The screen board 4c is fixed to the camera support 4. An electronic flash 20 synchronized with the shutter of the primary camera 1 is provided.

An operation of the apparatus constructed as above will be described.

A monitor camera 21 such as a still video camera or an instant camera with a zoom lens 22 is mounted to the monitor base 17 such that the optical axis Y of the lens 22 is vertical and the lens 22 faces upward. After the fixing knobs 19 of the links 12 are loosened, the adjustment knobs 14 fixed to the rotational shaft 8 are turned. When the rotational shaft 8 is turned through the adjustment knobs 14, the pinions 8a provided to the rotational shaft 8 gearing with the racks 6b and move in the vertical direction (direction denoted by the arrow c or d in FIGS. 1 and 2). Therefore, the rotational shaft 8 moves in the vertical direction along the elongated hole 9a as the adjustment knobs 14 are turned. In this time, the shaft 18 also moves vertically along the elongated holes 17b by the same amount as the rotational shaft 8 because the links 12 are interlinked with the links 10 at their middle portions. As the result, the monitor base 17 moves in the direction denoted by the arrow a or b in FIGS. 1 and 2 as it keeps parallel with the sliding plate 6. Therefore, the monitor camera 21 is moved in the direction parallel to the optical axis X of the lens 2 of the primary camera 1 and the optical axis Y of the lens 22 of the monitor camera 21 is also adjusted parallelly.

When the optical axis Y intersects the optical axis X at the reflection surface 5a of the half mirror 5, the adjustment is finished. Then, the fixing knobs 19 are driven home to fix the position of the monitor base 17. Subsequently, the sliding plate 6 is ascended or descended in the direction denoted by the arrow c and d in FIGS. 1 and 2 to move the monitor camera 21 perpendicularly to the optical axis X of the lens 2 of the primary camera 1. In this manner, the monitor camera 21 can be located such that the lens 22 of the monitor camera 21 and the lens 2 of the primary camera 1 are at the symmetrical positions with respect to the reflection surface 5a of the half mirror 5. After this, the field angle of the lens 22 is equalized to that of the lens 2 by zooming.

In this case, although the image formed on the image surface of the monitor camera 21 has the same scope as the image formed on the film surface of the primary camera 1, the image of the monitor camera 21 is reversed in right and left in comparison with the image of the primary camera 1 because the former is a reflection image by the half mirror 5.

Accordingly, it is preferable to reverse the right and left of the image in the monitor camera 21 with an electric circuit if the monitor camera 21 is a still video camera. If the monitor camera 21 is an instant camera, it is preferable to use a photographic film such as an SX-70 (Trademark of Polaroid Corp.) film by which an image reversed in right and left in comparison with an image on an ordinary photographic film can be obtained. In this manner, a monitor image entirely equivalent to the image by the primary camera can be obtained by the monitor camera.

In an actual operation, after the camera support 4 to which the primary camera 1 and the monitor camera 21 have been fixed is put at the position at which an object is within the field angle, the lens 2 of the primary camera 1 is focused by moving the camera mount 3 back and forth as the focal surface of the lens 2 is observed. On the other hand, the focusing operation of the lens 22 of the monitor camera 21 is taken place as the finder of the camera 21 is looked through. In this case, the lens 2 of the primary camera 1 is fixed to the camera support 4 through the lens board 1a and the lens 22 of the monitor camera 21 is a zoom lens of the type that only its front part is moved for focussing. Therefore, since the principal points of both lenses 2 and 22 are not moved in their focusing operations, the symmetrical relationship between both lenses 2 and 22 is kept.

After focusing, the shutters of the primary camera 1 and monitor camera 21 are released at the same time. In this embodiment, for syncronizing the shutter timing of the monitor camera 21 with that of the primary camera 1, a photosensor 23 is provided on the camera support 4 as shown in FIG. 1. When the photosensor 23 receives light from the electronic flash 20 which emits the light at the moment that the shutter of the primary camera 1 fully opens, the photosensor 23 generates a light detection signal. The shutter of the monitor camera 21 is relased by shutter release means 24 in response to the light detection signal.

In this manner, a monitor picture without any parallax and timelag can be obtained by the monitor camera 21 and, therefore, the image of the objective photograph by the primary camera 1 can be checked through the monitor picture.

Although the half mirror 5 is inclined such that its normal line crosses each of the optical axis X of the lens 2 and the optical axis Y of the lens 22 at 45° in the above embodiment, the inclination of the half mirror 5 is not limited to the specific angle. It may be changed within the range that the half mirror 5 can reflect a part of light from the object and allows another part of the light to pass through it. In such a case, it is preferable that the half mirror 5 is nearer to the verticality than that of the above embodiment within the range that the lens 22 of the monitor camera 21 is out of the field angle of the lens 2 of the primary camera 1. In this manner, the size of the mirror 5 can be decreased and it becomes possible to minimize the distortion of light from the object to the lens 2 of the primary camera 1 because of the distortion of the half mirror 5.

Although the monitor camera 21 is disposed vertically such that the optical axis Y of the lens 22 and the optical axis X of the lens 2 are in a vertical plane in the above embodiment, the monitor camera 21 may be disposed such that the optical axis Y of the lens 22 and the optical axis X of the lens 2 are in a horizontal plane. In that case, of course, the arrangement of the half mirror 5 must be changed so that the lenses 2 and 22 are at the symmetrical positions with respect to the mirror 5. In this manner, although the space for setting the apparatus increases to some extent, operations such as positioning and focussing of the monitor camera 21 become easy.

According to the present invention, since a monitor image without any parallax and timelag from the image on an objective photograph by the primary camera can be obtained by the monitor camera, the appearance of the object such as the expression and pose which will be obtained on the objective photograph can be checked through the monitor image on the spot. Moreover, the lighting effect on the objective photograph and the composition of the image can be also checked. If there is an impropriety, it is possible to retake at once. Therefore, in many cases, it is enough to take only one as the objective photograph so expensive large size film can be saved.

Having described an illustrative embodiment of the invention with reference to the accompanying drawings, it is to be understood that the invention is not limited to such a precise embodiment, and that various changes and modifications may be effected therein by one skilled in the art without departing from the scope and spirit of the invention as defined in the appended claims.

What is claimed is:

1. An apparatus for taking photographs with a monitoring system comprising:
   a primary camera having a lens with an optical axis and a shutter for taking an objective photograph of an object;
   a still video camera having a lens for monitoring the object; and
   a half mirror disposed in front of said lens of said primary camera obliquely in relation to said optical axis of said lens of said primary camera,
   said lens of said still video camera and said lens of said primary camera being located at symmetrical positions to each other with respect to said half mirror.

2. An apparatus for taking photographs with a monitoring system according to claim 1, wherein said apparatus further comprises:
   a camera support for mounting said primary camera, said still video camera and said half mirror; and
   position adjustment means for adjusting the position of said still video camera such that said lens of said still video camera and said lens of said primary camera are located at symmetrical positions to each other with respect to said half mirror.

3. An apparatus for taking photographs with a monitoring system according to claim 1, wherein said apparatus further comprises:
   a flash synchronized with said shutter of said primary camera;
   a photosensor for generating a light detection signal when it receives light from said flash; and
   still video actuating means for actuating said still video camera in response to said light detection signal.

4. An apparatus for taking photographs with a monitoring system according to claim 2, wherein said position adjustment means comprises:
   a vertical movement mechanism for moving said still video camera perpendicularly to said optical axis of said lens of said primary camera; and
   a lateral movement mechanism for moving said still video camera parallel to said optical axis of said lens of said primary camera.

5. An apparatus for taking photographs with a monitoring system according to claim 4, wherein said vertical movement mechanism comprises a rack and pinion mechanism.

6. An apparatus for taking photographs with a monitoring system as set forth in claim 1 further comprising:
   means for correcting a reversed image of the object received by said still video camera from said half mirror such that said still video camera outputs a non-reversed image of the object.

7. An apparatus for taking photographs with a monitoring system as set forth in claim 6, wherein
   said means for correcting a reversed image is an electronic circuit connected to said still video camera.

8. An apparatus for taking photographs with a monitoring system comprising:
   a primary camera having a lens with an optical axis and a shutter for taking an objective photograph of an object;
   an instant camera having a lens and a shutter for monitoring the object; and a half mirror disposed in front of said lens of said primary camera obliquely in relation to said optical axis of said lens of said primary camera, said lens of said instant camera and said lens of said primary camera being located at symmetrical positions to each other with respect to said half mirror.

9. An apparatus for taking photographs with a monitoring system according to claim 8, in wherein said apparatus further comprises:

a camera support for mounting said primary camera, said instant camera and said half mirror; and position adjustment means for adjusting the position of said instant camera such that said lens of said instant camera and said lens of said primary camera are located at symmetrical positions to each other with respect to said half mirror.

10. An apparatus for taking photographs with a monitoring system according to claim 8, wherein said apparatus further comprises:

a flash synchronized with said shutter of said primary camera;

a photosensor for generating a light detection signal when it receives light from said flash; and shutter release means for releasing said shutter of said instant camera in response to said light detection signal.

11. An apparatus for taking photographs with a monitoring system according to claim 9, wherein said position adjustment means comprises:

a vertical movement mechanism for moving said instant camera perpendicularly to said optical axis of said lens of said primary camera; and a lateral movement mechanism for moving said instant camera parallel to said optical axis of said lens of said primary camera.

12. An apparatus for taking photographs with a monitoring system according to claim 11, wherein said vertical movement mechanism comprises a rack and pinion mechanism.

13. An apparatus for taking photographs with a monitoring system as set forth in claim 8, further comprising:

means for correcting a reversed image of the object received by said instant camera from said half mirror such that said instant camera outputs a non-reversed photograph of the object.

14. An apparatus for taking photographs with a monitoring system as set forth in claim 13, wherein said means for correcting a reversed image is reversing film.

* * * * *